United States Patent
Song et al.

(10) Patent No.: US 7,779,250 B2
(45) Date of Patent: Aug. 17, 2010

(54) METHOD FOR APPLYING CERTIFICATE

(75) Inventors: Chen-Hwa Song, Taipei (TW);
Chih-Yin Lin, Taichung County (TW);
Yau-Deh Tzeng, PingTung County (TW)

(73) Assignee: Industrial Technology Research Institute, Hsinchu (TW)

(*) Notice: Subject to any disclaimer, the term of this patent is extended or adjusted under 35 U.S.C. 154(b) by 959 days.

(21) Appl. No.: 11/308,551

(22) Filed: Apr. 6, 2006

(65) Prior Publication Data

US 2007/0162742 A1    Jul. 12, 2007

(30) Foreign Application Priority Data

Dec. 30, 2005    (TW) .............................. 94147578 A

(51) Int. Cl.
*H04L 29/06*    (2006.01)
*H04K 1/00*    (2006.01)

(52) U.S. Cl. ....................... 713/156; 713/158; 380/255; 380/270

(58) Field of Classification Search ................. 380/255, 380/270; 713/158
See application file for complete search history.

(56) References Cited

U.S. PATENT DOCUMENTS

| | | | | |
|---|---|---|---|---|
| 6,023,689 | A | 2/2000 | Herlin et al. ................... 705/67 |
| 6,223,291 | B1 | 4/2001 | Puhl et al. ..................... 726/28 |
| 6,463,534 | B1 | 10/2002 | Geiger et al. ................ 713/168 |
| 6,629,243 | B1 | 9/2003 | Kleinman et al. ........... 713/163 |
| 6,847,816 | B1 | 1/2005 | Sarradin ...................... 455/407 |
| 6,934,533 | B2 | 8/2005 | Joyce et al. ............... 455/414.1 |
| 6,944,479 | B2 | 9/2005 | Andaker et al. ............. 455/560 |
| 2005/0138365 | A1* | 6/2005 | Bellipady et al. ............ 713/158 |
| 2006/0002556 | A1* | 1/2006 | Paul ............................. 380/270 |
| 2006/0262929 | A1* | 11/2006 | Vatanen et al. .............. 380/255 |

FOREIGN PATENT DOCUMENTS

KR    20030023124    3/2003

OTHER PUBLICATIONS

"1st Office Action of China Counterpart Application, issued on Jul. 24, 2009", P1-P5.

* cited by examiner

*Primary Examiner*—Shin-Hon Chen
(74) *Attorney, Agent, or Firm*—Jianq Chyun IP Office

(57) ABSTRACT

The invention is directed to a method for applying a certificate suitable for a portable telephone belonging to a user, wherein the portable telephone comprises a telephone number. The method comprises steps of generating a user key pair in the portable telephone, wherein the key pair comprises a user public key information and then transmitting an applying packet from the portable telephone to a certificate authority through a switching center by using a short message service, wherein the applying packet comprises at least the user public key information. The user is verified according to the telephone number received by the certificate authority from the switching center. A certificate packet is generated by the certificate authority, wherein the certificate packet comprises at least a serial number and a certificate authority signature. The certificate packet is transmitted to the portable telephone according to the telephone number by using the short message service.

20 Claims, 1 Drawing Sheet

METHOD FOR APPLYING CERTIFICATE

CROSS-REFERENCE TO RELATED APPLICATION

This application claims the priority benefit of Taiwan application serial no. 94147578, filed on Dec. 30, 2005. All disclosure of the Taiwan application is incorporated herein by reference.

BACKGROUND OF THE INVENTION

1. Field of Invention

The present invention relates to a method for applying a certificate. More particularly, the present invention relates to a method for applying a certificate through a short message service.

2. Description of Related Art

Generally, the electronic identification IC card is the identification card in the internet. As the internet becomes more popular than ever, the user can handle or transmit the personal data and conduct the business activity through the internet. However, it is not easy to confirm the individual identity on the internet. Furthermore, the data transmitted through the internet is not absolutely safe. Therefore, most of the government offices and the organizations require users to conduct the personal affairs in person.

In order to improve the safety and convenience for the user to handle personal data through the internet, the certificate is developed. The certificate is an electronic signature and electronic password approved by both the user and the information exchanger of the user. The user can use the electronic signature to encrypt the date transmitted on the internet without being anxious about that the transmitted data is intercepted by others. After the certificate is issued, conducting the personal data, transmitting private information and proceeding business activities can be all done through the internet without attending different departments in person.

Generally, in the process for applying the certificate, the user needs to provide personal identification document such as identification card and attends the administration department in person. Sometimes, the user even needs to show more than two photo IDs to apply for the certificate. Taking the applying procedure for the natural person certificate of the Republic of China as an example, the applicant shall go to the his/her residential register office to apply for the certificate in person. Nevertheless, this kind of procedure is complex and inconvenient.

SUMMARY OF THE INVENTION

Accordingly, at least one objective of the present invention is to provide a method for applying a certificate capable of using a short message service to transmit information with respect to a user to a certificate authority and simplifying the in-person application procedure.

To achieve these and other advantages and in accordance with the purpose of the invention, as embodied and broadly described herein, the invention provides a method for applying a certificate suitable for a portable telephone belonging to a user, wherein the portable telephone comprises a subscriber identify module having an identification number and a telephone number. The method comprises steps of generating a user key pair in the portable telephone, wherein the key pair comprises a user public key information and then transmitting an applying packet from the portable telephone to a certificate authority through a switching center by using a short message service, wherein the applying packet comprises at least the user public key information. The user is verified according to the telephone number received by the certificate authority from the switching center. A certificate packet is generated by the certificate authority, wherein the certificate packet comprises at least a serial number and a certificate authority signature. The certificate packet is transmitted from the certificate authority to the portable telephone according to the telephone number by using the short message service.

In the method according to one embodiment of the present invention, the method further comprises a step of building up a certificate according to the serial number and the certificate authority signature in the certificate packet by the portable telephone.

In the method according to one embodiment of the present invention, the certificate complies with an X.509 certificate standard.

In the method according to one embodiment of the present invention, the certificate comprises a version information, the serial number, a signature algorithm, a certificate authority information, a certificate effective date, a certificate expiration date, a user information, the user public key information and the certificate authority signature.

In the method according to one embodiment of the present invention, the applying packet is encrypted with a certificate authority public key.

In the method according to one embodiment of the present invention, the certificate authority decrypts the applying packet with a certificate authority private key.

In the method according to one embodiment of the present invention, the step of verifying the user by the certificate authority further comprises a step of checking the user's identity with a carrier by using the received telephone number.

In the method according to one embodiment of the present invention, the applying packet further comprises the identification number.

In the method according to one embodiment of the present invention, the step of verifying the user by the certificate authority further comprises a step of checking the user's identity with a carrier by cross-checking the telephone number and the identification number.

In the method according to one embodiment of the present invention, the identification number includes an international mobile subscriber identification number.

In the method according to one embodiment of the present invention, the switching center includes a short message service center.

In the method according to one embodiment of the present invention, the short message service includes a point-to-point short message service.

In the method according to one embodiment of the present invention, the step of generating the user key pair comprises a step of performing an asymmetric key algorithm.

The present invention also provides a method for applying a certificate using a short message service system. The method comprises steps of providing a portable equipment belonging to a user, wherein the portable equipment has an identification number and a telephone number and then generating a user key pair in the portable equipment, wherein the user key pair comprises at least a user public key information. An applying packet from the portable equipment is received by a certificate authority through the short message service system and receiving the telephone number from the short message service system by the certificate authority, wherein the applying packet comprises at least the user public key information and the identification number. The user is verified by the certificate authority according to the identification number and the telephone number in the received applying packet. A serial number and a certificate authority signature are issued to the portable equipment according to the telephone number. A certificate is built up in the portable equipment according to the received serial number and the received certificate authority signature.

In the method according to one embodiment of the present invention, the certificate includes a version information, the serial number, a signature algorithm, a certificate authority information, a certificate effective date, a certificate expiration date, a user information, the user public key information and the certificate authority signature.

In the method according to one embodiment of the present invention, the step of issuing the serial number and the certificate authority signature to the portable equipment further comprises a step of transmitting the version information, the signature algorithm, the certificate authority information, the certificate effective date, the certificate expiration date, the user information and the user public key information to the portable equipment according to the telephone number.

In the method according to one embodiment of the present invention, the identification number includes an international mobile subscriber identification number.

In the method according to one embodiment of the present invention, the short message service system includes a point-to-point short message service.

In the method according to one embodiment of the present invention, the step of verifying the user by the certificate authority further comprises a step of checking the user's identity with a carrier by cross-checking the telephone number and the identification number.

In the method according to one embodiment of the present invention, the step of generating the user key pair comprises a step of performing an asymmetric key algorithm.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
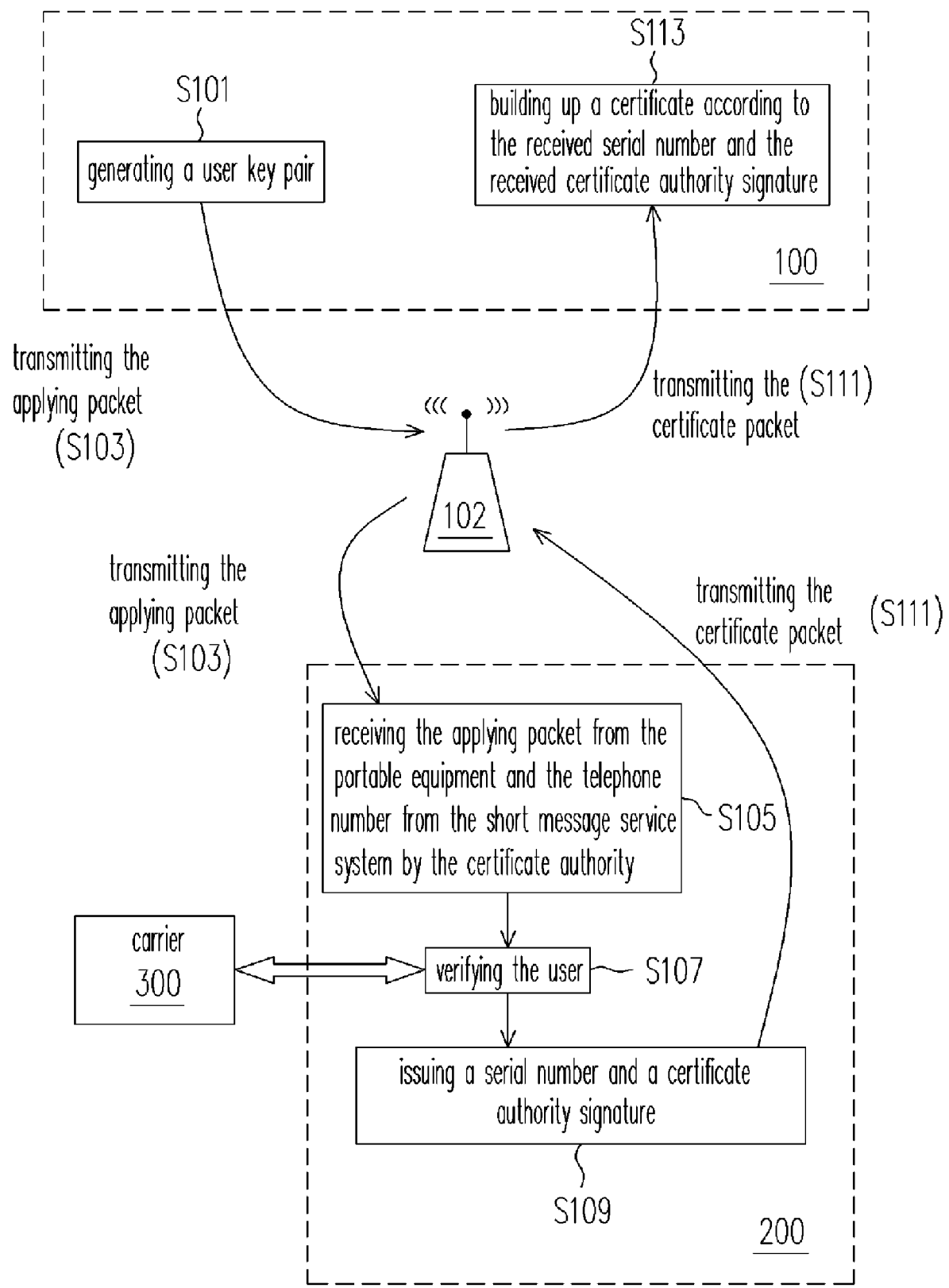
FIG. 1 is a flow chart showing a method for applying a certificate according to one embodiment of the present invention.

FIG. 1 is a flow chart showing a method for applying a certificate according to one embodiment of the present invention. As shown in FIG. 1, a portable equipment 100 is provided. The portable equipment 100 can be, for example but not limited to, a portable telephone. Furthermore, the portable equipment 100 belongs to a user and the portable equipment 100 possesses an identification number and a telephone number. Preferably, a subscriber identify module is assembled on the portable equipment 100 and the subscriber identify module can be issued together with the telephone number by a carrier 300. The subscriber identify module comprises the aforementioned identification number. Moreover, the identification number can be, for example but not limited to, an international mobile subscriber identification number (IMSI number). Also, the identification number can be the telephone number issued by the carrier 300.

In the step S101, a user key pair is generated in the portable equipment 100. The user key pair comprises at least a user public key information. Preferably, the user key pair further comprises a user private key information. Furthermore, the method for generating the aforementioned user key pair comprises a step of performing an asymmetric key algorithm such as RSA key algorithm, DSA key algorithm, Diffie-Hellman key algorithm, Knapsack system, ElGamal public key cryptographic technology, McEliece public key cryptographic technology, LUC key system, Finite Automation system, Ong-Schnorr-Schamir key system, Efficient Digital Signature (EDE) key system, Cellular Automation system, Elliptic Curve Cryptosystem and GOST DSA key system.

Then, in the step S103, an applying packet is transmitted from the portable equipment 100 to a certificate authority 200. The applying packet comprises the user public key information and the identification number. The applying packet is transmitted through a communication system such as a short message service system. Further, the communication system comprises a switching center 102 such as a short message service center. That is, the switching center 102 receives the applying packet from the portable equipment 100 and transmits the applying packet to the certificate authority 200. It should be noticed that the applying packet is encrypted with a certificate authority public key. Additionally, the short message service system includes a point-to-point short message service.

In the step S105, at the time the certificate authority 200 receives the applying packet, the certificate authority 200 also receives a caller ID from the switching center 102. The caller ID is the telephone number from which the received applying packet is sent. Then, the certificate authority 200 decrypts the received applying packet with a certificate authority private key while the applying packet was encrypted with the certificate authority public key.

Thereafter, when the applying packet includes the identification number, the certification authority 200 verifies the user according to the identification in the applying packet and the caller ID received from the switching center 102 (step S107). Notably, the certificate authority 200 can possess a database for tracing the corresponding telephone number according to the identification number or retrieving the corresponding identification number according to the caller ID. Furthermore, the certificate authority 200 can, for example, connect to the carrier 300 and cross checks the received identification number and the caller ID by directly using the database of the carrier 300. Additionally, when the identification packet is not included in the applying packet, the certificate authority 200 still can check the user's identity with the carrier 300 according to the received caller ID from the switching center 102 (step S107).

In the step S109, when certificate authority 200 confirms the user's identity, the certificate authority 200 issues a certificate and transmits a certificate packet according to the certificate. The certificate complies with the X.509 standard. Moreover, the certificate comprises a version information, a serial number, a signature algorithm, a certificate authority information, a certificate effective date, a certificate expiration date, a user information, the user public key information and a certificate authority signature. Preferably, the certificate packet comprises at least the aforementioned serial number and the aforementioned certificate authority signature. That is, in one embodiment, the certificate authority packs the serial number and the certificate authority signature to be the certificate packet according to the issued certificate. In another embodiment, the certificate packet can comprises the aforementioned information in the certificate, wherein the information includes the version information, the signature algorithm, the certificate authority information, the certificate effective date, the certificate expiration date, the user information and the user public key information. Also, the aforementioned user information comprises the identification number or the telephone number.

In the step S111, the certificate packet is transmitted from the certification authority 200 to the portable equipment 100 according to the caller ID received by the certificate authority 200. The certificate packet is transmitted through a communication system such as a short message service system. The certificate packet from the certificate authority 200 is received by the switching center 102 and transmitted to the portable equipment 100 from the switching center 102.

In the step S113, a certificate is built up in the portable equipment 100 according to the serial number and the certificate authority signature in the received certificate packet. The certificate generated in the portable equipment 100 is the user public key certificate. The certificate can be, for example, comply with the X.509 standard and the certificate comprises the version information, the signature algorithm, the certification authority information, the user public key information, the telephone number, the identification number, the certificate effective date, the certificate expiration date, the serial number and the certificate authority signature. That is, when the re-built certificate complies with the X.509 standard, the certificate comprises the version information, the serial number, the signature algorithm, the certificate authority information, the certificate effective date, the certificate expiration date, the user information, the user public key information and the certificate authority signature. In one embodiment, the way to define the aforementioned certificate effective date and the certificate expiration date comprises steps of estimating the certificate effective date approved by the certificate authority as the certificate is issued and adding a fixed period time to obtain the estimated expiration date of the certificate. Furthermore, in another embodiment, since, at the time the user applies for the certificate, the information such as the user public key information and the user information which can be the identification number or the telephone number us the known information, the known information can be automatically inserted into the re-built certificate even through the certificate packet transmitted from the certificate authority does not include the user public key information and the user information.

By connecting the portable equipment to other equipments or server through the wireless local area network (WLAN) or the general packet radio service (GPRS), the user can use the user public key certificate to cross certify with others and to enjoy the on-line shopping and internet banking service and to make the on-line payment and even the advance on-line data retrieving.

Before the carrier 300 issues the subscriber identify module and the telephone number to the user, the carrier 300 will proceed an identity verification process in which the user is required to show the effective identity documents, the carrier 300 registers the user's identification number and even the carrier 300 connects to the credit union administration to check the user's credibility. That is, at the time the user receive the subscriber identify module, the user's identity has been also carefully checked through a strict identity check. Accordingly, the certificate authority cross check the received subscriber identification number and/or the telephone number (caller ID received from the switching center) or confirms the user identity to the carrier with the use of the aforementioned received information to accomplish the user identity verification process. Thereafter, through the telecommunication service such as short message service, the user public key certification is transmitted from the certificate authority to the user' portable equipment according to the caller ID. Hence, the user does not need to conduct the certificate authority in person and the process for applying a certificate is simplified.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for applying a certificate suitable for a portable telephone belonging to a user, wherein the portable telephone comprises a subscriber identify module having a telephone number, the method comprising:
   receiving an applying packet from the portable telephone by a certificate authority through a switching center and receiving a caller ID corresponding to the telephone number from the switching center by the certificate authority;
   obtaining an identity of the user by the certificate authority, wherein the certificate authority uses the caller ID received from the switching center to retrieve the identity of the user from a database associated with the certificate authority;
   generating a certificate packet by the certificate authority, wherein the certificate packet comprises at least a serial number and a certificate authority signature; and
   transmitting the certificate packet from the certificate authority to the portable telephone according to the caller ID.

2. The method of claim 1 further comprising a step of building up a certificate according to the serial number and the certificate authority signature in the certificate packet by the portable telephone.

3. The method of claim 2, wherein the certificate complies with an X.509 certificate standard.

4. The method of claim 2, wherein the certificate comprises a version information, the serial number, a signature algorithm, a certificate authority information, a certificate effective date, a certificate expiration date, a user information, the user public key information and the certificate authority signature.

5. The method of claim 2, before the step of receiving the applying packet from the portable telephone by the certificate authority, further comprising generating a user key pair in the portable telephone by using an asymmetric key algorithm and the user key pair comprises at least a user public key information which is used to be included in the certificate while the certificate is built up by the portable telephone.

6. The method of claim 1, wherein the applying packet is encrypted with a certificate authority public key.

7. The method of claim 6, wherein the certificate authority decrypts the applying packet with a certificate authority private key.

8. The method of claim 1, wherein the database is provided by a carrier.

9. The method of claim 1, wherein the applying packet further comprises an identification number of the subscriber identify module.

10. The method of claim 9, wherein the step of obtaining the identity of the user further comprises a step of checking the identity of the user with a carrier by cross-checking the caller ID and the identification number.

11. The method of claim 9, wherein the identification number includes an international mobile subscriber identification number.

12. The method of claim 1, wherein the switching center includes a short message service center.

13. The method of claim 1, wherein the applying packet received by the certificate authority is transmitted from the portable telephone across a short message service system and the short message service system includes a point-to-point short message service.

14. A method for a portable equipment to apply a certificate, wherein the portable equipment belonging to a user having an identification number and a telephone number, the method comprising:
   receiving an applying packet from the portable equipment by a certificate authority through a switching center and receiving a caller ID corresponding to the telephone number from the switching center by the certificate authority, wherein the applying packet comprises at least the identification number;
   obtaining an identity of the user by the certificate authority using the identification number in the received applying packet and the caller ID provided by the switching center to map with a personal information in a database of the certificate authority;
   issuing a serial number and a certificate authority signature to the portable equipment according to the caller ID; and
   building up a certificate in the portable equipment according to the received serial number and the received certificate authority signature.

15. The method of claim 14, wherein the certificate includes a version information, the serial number, a signature algorithm, a certificate authority information, a certificate effective date, a certificate expiration date, a user information, a user public key information and the certificate authority signature.

16. The method of claim 15, wherein the step of issuing the serial number and the certificate authority signature to the portable equipment further comprises a step of transmitting the version information, the signature algorithm, the certificate authority information, the certificate effective date, the certificate expiration date, the user information and the user public key information to the portable equipment according to the caller ID.

17. The method of claim 14, wherein the identification number includes an international mobile subscriber identification number.

18. The method of claim 14, wherein the applying packet received by the certificate authority is transmitted from the portable equipment across a short message service system and the short message service system includes a point-to-point short message service.

19. The method of claim 14, wherein the step of obtaining the identity of the user by the certificate authority further comprises a step of verifying the identity of the user with a carrier by cross-checking the caller ID and the identification number.

20. The method of claim 14, before the step of receiving the applying packet from the portable telephone by the certificate authority, further comprising generating a user key pair in the portable telephone by using an asymmetric key algorithm and the user key pair comprises at least a user public key information which is used to be included in the certificate while the certificate is built up by the portable equipment.

\* \* \* \* \*